United States Patent [19]

Kobayashi et al.

[11] Patent Number: 4,986,995
[45] Date of Patent: Jan. 22, 1991

[54] PROCESS FOR PRODUCING RETORT BOILED RICE

[75] Inventors: Yukio Kobayashi; Hitoshi Sasaki; Norishige Matsuo; Mitsuru Ohba, all of Kawasaki, Japan

[73] Assignee: Ajinomoto Co., Inc., Tokyo, Japan

[21] Appl. No.: 454,934

[22] Filed: Dec. 22, 1989

[30] Foreign Application Priority Data

Dec. 23, 1988 [JP] Japan .................................. 63-320401
Nov. 30, 1989 [JP] Japan .................................. 1-311717

[51] Int. Cl.$^5$ ............................ A23B 9/02; A23B 9/20
[52] U.S. Cl. .................................. 426/412; 426/316; 426/402; 426/407
[58] Field of Search ............... 426/412, 113, 627, 618, 426/234, 626, 407, 399, 325, 418, 419, 316, 402

[56] References Cited

U.S. PATENT DOCUMENTS

| | | | |
|---|---|---|---|
| 3,532,508 | 10/1970 | Ott | 426/401 |
| 3,552,982 | 1/1971 | Savidge | 426/412 |
| 3,647,486 | 3/1972 | Tollefson et al. | 426/618 |
| 3,769,028 | 10/1973 | Katz et al. | 426/412 |
| 3,773,527 | 11/1973 | Ruggerone | 426/419 |
| 3,892,058 | 7/1975 | Komatsu et al. | 426/412 |
| 3,949,114 | 4/1976 | Viola et al. | 426/412 |

FOREIGN PATENT DOCUMENTS

| | | | |
|---|---|---|---|
| 692538 | 8/1964 | Canada | 426/401 |
| 2130906 | 11/1972 | France | 426/618 |
| 51-41454 | 4/1976 | Japan | 426/618 |
| 54-14659 | 6/1979 | Japan | 426/401 |
| 55-2263 | 1/1980 | Japan | 426/618 |
| 60-172263 | 9/1985 | Japan | 426/412 |

Primary Examiner—Steven Weinstein
Attorney, Agent, or Firm—Oblon, Spivak, McClelland, Maier & Neustadt

[57] ABSTRACT

A process for producing retort boiled rice by charging raw rice and water into a container, adjusting the quantity of oxygen in the head space of the container to from 4–12 ml/100 g of raw rice, sealing the container and then boiling and sterilizing the rice.

5 Claims, No Drawings

PROCESS FOR PRODUCING RETORT BOILED RICE

BACKGROUND OF THE INVENTION

1. Field of the Invention

The present invention relates to a process for producing retort boiled rice directly from raw rice, with no coloring of rice.

2. Discussion of the Background

Heretofore, retort rice has been produced by a method in which raw rice is boiled at about ambient pressure, and a predetermined quantity of rice so boiled or steamed is weighed and charged into a container, followed by sealing and retorting. Alternatively, retort rice has been produced by charging a predetermined quantity of raw rice into a container together with water, sealing the container, and then performing the boiling and sterilization of the rice under retort conditions. In either method, however, the resulting boiled rice is inevitably colored brown.

If raw rice is charged into a container or bag together with water and, after the sealing of the container or bag, boiled under retort conditions without replacing, neither in part nor whole, the air in the head space of the container or bag with an inert gas, there is results boiled rice having a brown color. In the case where all of the air in the head space above the rice and water is replaced with an inert gas, such as nitrogen gas or the like, for the purpose of avoiding the undesirable coloring, there results boiled rice having a bluish light gray color. This undesirable coloring can be avoided if the boiling of the rice is carried out at a relatively low temperature for a prolonged period of time. In this method, however, a retort rice product having inferior preservability results due to insufficient sterilization. In addition, it is time-consuming and hence requires energy in quantities larger than in the present invention.

In view of the above problems, a need continues to exist for a process for producing retort boiled rice which is free from the undesirable coloring.

It is presumed that the coloring (browning) is caused by reaction products between oxygen and certain components of rice or products formed through decomposition of certain rice components. It is also presumed that the browning phenomenon is related to not only oxygen, but also heating temperature and time. The phenomenon does not take place at temperatures of ordinary home use pressure cookers. However, the surface of boiled rice becomes colored under high temperature retort conditions (120° C. or above) commonly employed in the food industry, if oxygen is present in the system in quantities above a certain level.

SUMMARY OF THE INVENTION

Accordingly, one object of the present invention is to provide a process for producing retort boiled rice which produces rice having no undesirable coloring and yet retaining good taste characteristics.

This and other objects which will become apparent from the following specification have been achieved by the present process in which raw rice and water are charged into a container; the quantity of oxygen in the head space of the container is adjusted to from 4–12 ml per 100 grams of raw rice using an inert gas and then the rice is boiled.

DETAILED DESCRIPTION OF THE PREFERRED EMBODIMENTS

Under high temperature retort conditions, boiled rice is not colored if oxygen is present in an amount of 12 ml or less, per 100 g of raw rice, and boiled rice having only inferior flavor results if oxygen is present in an amount exceeding 12 ml. On the other hand, if the quantity of oxygen is decreased to 4 to 0 ml per 100 g of raw rice, there results boiled rice which is colored to a bluish brown to a degree clearly recognizable by the naked eye. Accordingly, if part of the oxygen in the head space of a container is replaced by an inert gas, such as nitrogen or the like, to adjust its quantity to 4 to 12 ml, per 100 g of raw rice (which corresponds to oxygen concentrations in the range of 2 to 6% in the case where 100 g of rice is charged into a container of 400 ml) and the rice is boiled, after the sealing of the containing, under high temperature retort conditions, non-colored boiled rice with no deterioration of its flavor is obtained.

Retort packs of rice have hitherto been produced by either of the following methods:

(1) Rice is boiled or steamed at around ordinary temperature and ambient pressure and cooled to an appropriate temperature; a predetermined quantity of rice so boiled or steamed is weighed and charged into a retort container; the air in the head space (vacant space) of the container is sealed; and then the rice is subjected to retorting or retort sterilization under relatively low temperature conditions; or (2) A predetermined amount of raw rice is weighed and charged into container together with a predetermined quantity or water; the air in the head space of the container is replaced by an inert gas, such a nitrogen or the like; the container is sealed; and then boiling and sterilization of the rice are simultaneously effected under high temperature retort conditions (in this case, the boiled rice is colored in bluish light gray).

As mentioned above, the above method (2) results in undesirable coloring of rice a bluish light gray. In addition, rice products produced by the method have a slight hydrogen sulfide odor. When the step of replacing air by an inert gas is omitted in method (2), the resulting rice will have an unpleasant flavor. Although the coloring may not become noticeable in the case of boiled rices with assorted mixtures, such as boiled rice with red beans and boiled rice with wild plants, it becomes apparent in the case of a plain boiled rice. However, the method is energy efficient and can be advantageous in simplicity of weighing.

On the other hand, the process of the present invention makes it possible to obtain boiled rice which is excellent in flavor and is free from the undesirable coloring. Further, the process of the invention is as energy efficient as method (2). The present process, like the method (2), can be carried out by using less water since no water escapes in the form of vapor during the boiling step. Accordingly, the total energy required in the present process is only ½ to ⅓ of that in the method (1). The weighing step in the process of the present invention can be readily automated since material to be weighed is highly flowable raw rice just immersed in water. In addition, the process of the invention requires only a short production time.

If rice is boiled before it is charged into a container, the viscosity of boiled rice makes its handling highly difficult, and the grains of boiled rice are often crushed.

In contrast, the process of the present invention is free from such problems since material which is to be weighed and charged is hard and wet grains of raw rice. Because of these reasons, retort boiled rice obtainable by the process of the present invention has a higher commercial value than that of prior products.

Various materials can be used for the container to boil the rice. It is advantageous to use a material having excellent gas barrier properties, in particular oxygen barrier properties, since such a material is capable of providing retort boiled rice with excellent long-term preservability. The container is composed of a laminated material containing at least one layer of a material having an oxygen transmission rate of 2 ml/m²-day-atm or less at 20° C. and an oxygen transmission rate of 50 ml/m²-day-atm or less at 120° C. As examples of such materials, mention may be made of laminated products containing one or more layers of aluminum foil, vinylidene chloride resins, e.g. biaxially stretched vinylidene chloride resins, ethylene-vinyl alcohol copolymers, polyacrylonitrile resins, silicon oxide vacuum evaporation films, and the like.

The retort boiled rice according to the invention can be heated by a microwave oven if the container has a laminate structure in which one or more interlayers consisting of vinylidene chloride resins, ethylenevinylalcohol copolymers, polyacrylonitrile resins, silicon oxide vacuum evaporated films, or the like, are sandwiched with layers of, e.g., polypropylene, polyethylene or a material obtained by adding fillers to such polymers. There is no particular restriction on the kind of films to be used as a base for the silicon oxide vacuum evaporated films. As examples of films usable for this purpose, mention may be made of polyesters, nylons and polypropylene.

In cases where a lid-containing vessel is used as a container, the material to be used for the lid of the container is not necessarily the same as that used for the main body of the container. In cases where the vessel is to be heat sealed with a film or the like, there must be used a combination having good heat-sealing properties. In the examples described below, there were employed polypropylene vessels in combination with a lid of polypropylene. However, the material to be used as a lid for a polypropylene vessel is not limited to polypropylene.

As described above, when a container consisting of a material having a high oxygen transmission rate is used, colored boiled rice results. On the other hand, when a material having a high vapor transmission rate is used as a packing material, the resultant boiled rice becomes excessively sticky due to moisture penetration through the packing material during the high temperature retorting. Accordingly, if a packing material having not only an allowable oxygen transmission rate, but also a low vapor transmission rate is used, there can be obtained non-colored boiled rice which is excellent in both flavor and texture, even if boiling and sterilization are performed simultaneously under high temperature retort conditions.

The retort boiled rice product according to the invention can be treated with a microwave oven when the container is made of a packing material containing no metals, for example, a material in which one or more intermediate gas and vapor barrier layers of vinylidene chloride resins, ethylene-vinyl alcohol copolymers, polyacrylonitrile resins, silicon oxide vacuum evaporated films, or the like, are sandwiched by outer layers of polypropylene resins, polyethylene resins, a polypropylene or polyethylene resin incorporated with conventional fillers, polyester resins, or the like. In this case, the product can be heated quite conveniently without opening the container and hence can be served within a short period of time. Moreover, the product is of high commercial value since the packing material is transparent, and hence the contents contained in the container can be seen from the outside.

TABLE 1

Relationship of Raw Rice and Water
Raw Rice and Water Absorption (20° C.)

| Immersed Time (hrs) | Weight Increase (%) |
|---|---|
| 0.5 | 18.5 |
| 1 | 19.8 |
| 2 | 19.8 |
| 6 | 19.7 |
| 15 | 20.0 |

The water absorption rate of raw rice at 20° C. is shown in Table 1. The rate becomes almost constant after an immersion of 1 hour. In the examples, therefore, raw rice was used after being immersed for 1 hour. The object of the immersion is to swell starch contained in rice grains and to facilitate the gelatinization of the grains. In order to make the production process simpler, it is preferable to render raw rice saturated with water at a constant water absorption rate.

In ordinary non-retort boiling processes, rice is boiled with addition of water in an amount 1.5 times that of rice, and excessive water is allowed to escape in the form of vapor, thereby forming so-called "crab holes" which function as passages for the vapor. This is a technique to produce boiled rice having a soft texture.

In the process of the present invention, the ratio of water to rice was set at about 1:1, i.e., no excessive water is used, since boiling is performed in a sealed container. In order to obtain boiled rice having a soft texture, the boiling of rice was conducted with a relatively large head space within the container, thereby utilizing the retort sterilization technique.

The present invention will further be illustrated by examples. It should however be noted that the invention is by no means limited to these examples.

EXAMPLES

Reference Examples

In Table 2 is shown the conventional process which has been employed for the production of retort boiled rice. In this process, rice is boiled at ambient pressure, and a predetermined quantity of the rice so boiled is weighed and charged into a container. The air in the head space of the container is replaced by nitrogen, and the container is sealed, followed by retorting.

TABLE 2
Conventional Process for Producing Retort Boiled Rice

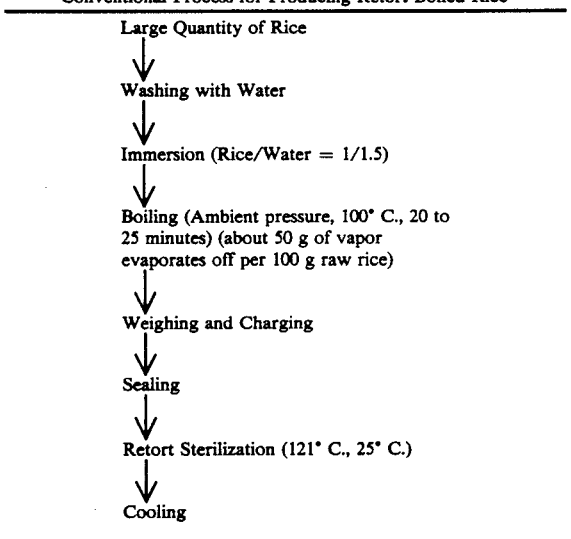

Large Quantity of Rice → Washing with Water → Immersion (Rice/Water = 1/1.5) → Boiling (Ambient pressure, 100° C., 20 to 25 minutes) (about 50 g of vapor evaporates off per 100 g raw rice) → Weighing and Charging → Sealing → Retort Sterilization (121° C., 25° C.) → Cooling

EXAMPLE 1

TABLE 3
Outline of the Process of the Present INVENTION

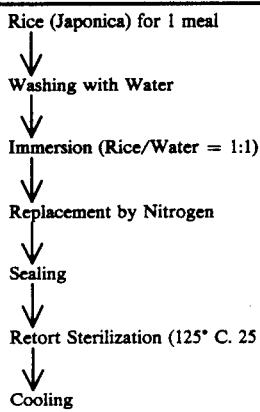

Rice (Japonica) for 1 meal → Washing with Water → Immersion (Rice/Water = 1:1) → Replacement by Nitrogen → Sealing → Retort Sterilization (125° C. 25 minutes) → Cooling (1) Sealing The containers used were sealed after part of the air in the head space in the container had been replaced by nitrogen to adjust the quantity of oxygen contained therein to 8 ml at ambient temperature, per 100 g of raw rice.

TABLE 4
Relationship between Quantity of Oxygen and Coloring & Flavor of Boiled Rice

| Quantity of Oxygen* | Appearance | Flavor |
|---|---|---|
| 40 | Brown | Unpleasant odor |
| 0 | Bluish gray | Odor of hydrogen sulfide |
| 4–12 | White | Good |
| 14–20 | Brown | No flavor |

*Quantity of oxygen (ml) per 100 g of raw rice (2) Retort Sterilization

In order to produce boiled rice having good texture, retorting was conducted with a head space of about 50% of the total volume of the containers. Because of this, it was performed under the following strict retort conditions: 120° C., 20 minutes, Fo=5 to 6. The difference between the pressure of the inside of the containers and that of the inside of the retort autoclave was ±1 kg. The resultant boiled rice was comparable in not only softness and texture but appearance to boiled rice obtained by using conventional rice cookers. At the same time, microorganisms contained in the containers were completely sterilized.

It was confirmed that retort boiled rice produced as above could be stored for about one year under ordinary distribution conditions without any discoloration and decomposition, and that the texture of freshly boiled rice could be enjoyed even after the storing. In this example, trays having a depth of about 5 cm and a capacity of about 400 ml were used as containers. Accordingly, the concentration of oxygen of their head space was 2 to 6%.

Results attained by the present process are shown in Table 5, in comparison with those attained by the conventional process.

TABLE 5
Comparison between Present Process and Prior Process

| Items | Present Invention | Reference Example |
|---|---|---|
| Time Required for Production | 100 min. | 200 min. |
| Weighing & Charging | Simple and easy (Predetermined quantity, for one meal, of raw rice is weighed and charged) | Difficult (Predetermined quantity, for one meal, of boiled rice is weighed and charged) |
| Sealing | Partially substituted by nitrogen | Completely substituted by nitrogen |
| Conditions for Retort Sterilization | 125° C., 25 min. (Gelatinization & boiling) | 121° C., 20 to 25 min. (Sterilization only) |
| Preservable Period | 1 year (when distribution at ordinary temperature) | 4 months (when distributed at ordinary temperature) |
| Organoleptic Evaluation | Comparable to boiled rice prepared by conventional rice cooker | Comparable to boiled rice prepared by conventional rice cooker |

EXAMPLE 2 - PLAIN BOILED RICE

| | |
|---|---|
| Rice immersed in water (Japonica) | 85 g |
| Water | 50 g |

Since 67 g of raw rice, when immersed in water, adsorbed about 18 g of water (total weight=85 g), the quantity of water to be supplemented was set at 50 g. The rice and water was placed in a flat tray (the same one as in Example 1). The tray was sealed after part of the air of its head space had been replaced by nitrogen gas to adjust the quantity of oxygen to 88 ml at ambient temperature, per 100 g of raw rice. The thus sealed tray was subjected to boiling sterilization treatment in the same manner and under the same conditions as in Example 1. The thus obtained retort packed plain boiled rice, as well as boiled rice produced by a conventional rice cooker (Control 1) and marketed retort packed boiled rice (Control 2) were organoleptically evaluated by a panel of 20 members. Boiled rices of Example 2 and Control 2 were evaluated in comparison with Control 1 (which was rated as 10).

TABLE 6

Results of Evaluation of Plain Boiled Rice

|  | Example 2 | Control 1 | Control 2 |
|---|---|---|---|
| Appearance | 9 | 10 | 8 |
| Mouth Feel | 9 | 10 | 9 |
| Taste | 10 | 10 | 10 |
| Flavor | 10 | 10 | 8 |
| Overall Rating | 9 | 10 | 8 |

The retort boiled rice according to the present invention was superior in all the above items evaluated to the marketed retort packed boiled rice, although it was slightly inferior to the boiled rice cooked by the conventional method using a conventional rice cooker.

The quantity of water adsorbed changed little, irrespective of the kind and quality of raw rice used, and the quality of resulting boiled rice showed no substantial change even when quantity of water used fluctuated by up to about 10%.

EXAMPLE 3 - SEKIHAN (BOILED RICE MIXED WITH RED BEANS)

| Glutinous rice washed with water | 120 g |
|---|---|
| Boiled adzuki beans | 20 g |
| Bean stock (used for boiling of adzuki beans) | 75 g |

In order to produce Sekihan (boiled rice mixed with red beans) of high commercial value, it is necessary to color it uniformly to a reddish-brown. Accordingly, 10 g of adzuki beans was boiled in 100 g of water for about 20 minutes, and the resulting beans (20 g) and the bean stock (75 g) were placed in a flat tray together with 120 g of washed glutinous rice, and subjected to simultaneous boiling and sterilization under the same conditions as in Example 1. In cases where sufficient amount of bean stock could not be obtained, the shortage was supplemented by water. Results of organoleptic tests are shown in Table 7.

TABLE 7

Results of evaluation of Sekihan

|  | Example 3 | Control 3 | Control 4 |
|---|---|---|---|
| Appearance | 9 | 10 | 9 |
| Mouth Feel | 10 | 10 | 9 |
| Taste | 10 | 10 | 9 |
| Flavor | 10 | 10 | 9 |
| Overall Rating | 10 | 10 | 9 |

The Sekihan according to the present invention was superior in all the items tested to Control 4 (marketed Sekihan) although it was inferior in appearance to Control 3 (Sekihan produced by a conventional rice cooker).

EXAMPLE 4 - SANSAIGOHAN (BOILED RICE MIXED WITH WILD PLANTS)

| Nonglutinous rice immersed in water | 85 g |
|---|---|
| Wild plants | 20 g |
| Seasoning liquid | 45 g |

The above ingredients were weighed and placed in a flat tray as in Example 2. Part of the air of its head space was replaced by nitrogen gas to adjust the quantity of oxygen to 8 ml, per 100 g of raw rice. After the tray had been sealed the boiling and sterilization were carried out simultaneously in the same manner as in Example 2.

TABLE 8

Results of Evaluation of Sansaigohan

|  | Example 4 | Control 5 | Control 6 |
|---|---|---|---|
| Appearance | 9 | 10 | 9 |
| Mouth Feel | 10 | 10 | 9 |
| Taste | 10 | 10 | 10 |
| Flavor | 10 | 10 | 10 |
| Overall Rating | 9.8 | 10 | 9.5 |

After boiling, the product according to the invention exhibited quality comparable to Control 6 (marketed Sansaigohan), and it was slightly inferior in appearance to Control 5 (Sansaigohan prepared by a conventional cooker).

EXAMPLE 5 - RICE GRUEL

| Rice immersed in water | 60 g |
|---|---|
| Water | 240 g |

The above ingredients were mixed and boiled in a similar manner as in Example 2, except that the retorting time was extended by 10 minutes to give a thin rice gruel. Upon organoleptic tests, the product gave the same results as in Example 2.

EXAMPLE 6

A retort boiled rice was produced in the same manner as in Example 2. As a control, a retort boiled rice was prepared in the same manner as in Example 2, except that a nylon/polyethylene laminated film was used as a sealing material for the tray. The boiled rice of the control was excessively sticky, lacked reproducibility and could not be controlled by adjusting the quantity of water added.

EXAMPLE 7

Retort boiled rice was produced in the same manner as in Example 2, except that the kind of rice used was changed for Japonica to Indicia. The same results as in Example 2 were obtained wherein Japonica rice was used.

When the air in the head space is not replaced by an inert gas, there is results boiled rice which is brown in color and suffers from an unpleasant odor. On the other hand, the process of the present invention makes it possible to obtain boiled rice which possesses good flavor and is free from the undesirable coloring. In addition, the process of the present invention requires less water and hence less energy since the quantity of water which escapes in the form of vapor during boiling is reduced. The energy required for boiling in the present process is only from ⅓ to ½ of that required in conventional processes. With regard to weighing, what is to be weighed in the present process is highly fluid raw rice which has been immersed in water, and hence the process can be readily automated and carried out within a shorter period of time.

In prior processes where rice is boiled prior to charging into a container, boiled rice is likely to be crushed and can be handled only with difficulty because of its stickiness. In contrast, in the present process in which wet grains of hard raw rice are weighed, there is no danger of crushing of the grains and the weighing and charging operations are easily performed thanks to its high fluidity. Because of above reasons, retort boiled rice products obtainable by the present process are of higher commercial value, compared with those obtainable by prior processes.

Obviously, numerous modifications and variations of the present invention are possible in light of the above teachings. It is therefore to be understood that within the scope of the appended claims, the invention may be practiced otherwise than as specifically described herein.

What is claimed is:

1. A process for producing retort boiled rice comprising the steps of:
   charging raw rice and water into a container;
   adjusting the quantity of oxygen in the head space of said container above the rice and water to a level of 4 to 12 ml per 100 g of raw rice by adding an inert gas to said head space;
   sealing said container to enclose said raw rice, water, inert gas and said head space oxygen level; and then
   boiling and, at the same time, retort sterilizing said raw rice in said sealed container.

2. The process of claim 1, wherein said container is composed of a laminated material containing at least one layer of a material having an oxygen transmission rate of 2 ml/$m^2$-day-atm or less at 20° C. and an oxygen transmission rate of 50 ml/$m^2$-day-atm or less at 120° C.

3. The process of claim 2, wherein said layer contained in said laminated material is a layer of a material selected from the group consisting of aluminum foil, vinylidene chloride resins, ethylene-vinyl alcohol copolymer resins, polyacrylonitrile resins and silicon oxide vacuum evaporated films.

4. The process of claim 2, wherein said layer contained in said laminated material is a layer of a material selected from the group consisting of vinylidene chloride resins, ethylene-vinyl alcohol copolymer resins, polyacrylonitrile resins and silicon oxide vacuum evaporated films.

5. The process of claim 2, wherein said layer contained in said laminated material is at least one layer of a material selected from the group consisting of biaxially stretched vinylidene chloride resins, ethylene-vinyl alcohol copolymer resins and polyacrylonitrile resins.

* * * * *